(12) United States Patent  (10) Patent No.: US 8,628,157 B2
Burek et al.  (45) Date of Patent: Jan. 14, 2014

(54) CABINET CABLE MANAGEMENT

(75) Inventors: Denis E. Burek, Cumming, GA (US);
Lynda Price, Oakwood, GA (US);
Willard C. White, Suwannee, GA (US)

(73) Assignee: OFS Fitel, LLC, Norcross, GA (US)

( * ) Notice: Subject to any disclaimer, the term of this patent is extended or adjusted under 35 U.S.C. 154(b) by 123 days.

(21) Appl. No.: 13/199,648

(22) Filed: Sep. 6, 2011

(65) Prior Publication Data
US 2013/0057128 A1  Mar. 7, 2013

(51) Int. Cl.
*A47B 81/00* (2006.01)
(52) U.S. Cl.
USPC .......................................... 312/223.6
(58) Field of Classification Search
USPC ................ 248/58, 65, 66, 68.1, 70, 74.1;
312/223.6; 211/26; 361/826; 385/135
See application file for complete search history.

(56) References Cited

U.S. PATENT DOCUMENTS

| | | | | |
|---|---|---|---|---|
| 4,570,437 A * | 2/1986 | Moritz | | 59/78.1 |
| 5,240,209 A * | 8/1993 | Kutsch | | 248/49 |
| 5,458,019 A * | 10/1995 | Trevino | | 74/502.4 |
| 5,640,482 A * | 6/1997 | Barry et al. | | 385/135 |
| 5,902,961 A * | 5/1999 | Viklund et al. | | 174/100 |
| 5,923,753 A * | 7/1999 | Haataja et al. | | 379/438 |
| 5,937,131 A * | 8/1999 | Haataja et al. | | 385/136 |
| 5,995,700 A * | 11/1999 | Burek et al. | | 385/135 |
| 6,011,221 A * | 1/2000 | Lecinski et al. | | 174/72 A |
| 6,541,705 B1 * | 4/2003 | McGrath | | 174/99 R |
| 6,665,484 B2 * | 12/2003 | Douglas et al. | | 385/136 |
| 6,945,027 B2 * | 9/2005 | Blase | | 59/78.1 |
| 7,837,156 B1 * | 11/2010 | Handler | | 248/58 |
| 8,143,521 B2 * | 3/2012 | Burek et al. | | 174/100 |
| 8,395,046 B2 * | 3/2013 | Nicewicz et al. | | 174/50 |
| 8,411,465 B2 * | 4/2013 | Dean et al. | | 361/826 |
| 2004/0124321 A1 * | 7/2004 | Kampf et al. | | 248/68.1 |
| 2008/0185483 A1 * | 8/2008 | Rapp et al. | | 248/68.1 |
| 2009/0078835 A1 * | 3/2009 | Newhouse et al. | | 248/74.1 |
| 2011/0192631 A1 * | 8/2011 | Burek et al. | | 174/101 |

FOREIGN PATENT DOCUMENTS

JP  11271556 A  * 10/1999  ............. G02B 6/255

* cited by examiner

*Primary Examiner* — Hanh V Tran
(74) *Attorney, Agent, or Firm* — Law Offices of Peter V. D. Wilde, Esq.

(57) ABSTRACT

A cable management cabinet is improved by separately managing the routing of data copper cables and optical fiber cables within the cabinet. This is accomplished by providing separate cable retaining boxes (CRBs) for data copper cables and optical fiber cables respectively. The CRBs are provided with front openings to facilitate installation and routing of optical fiber cables and data copper cables. The openings may be provided with edge guards to ease ingress/egress of cables through the openings.

15 Claims, 3 Drawing Sheets

CABINET CABLE MANAGEMENT

RELATED APPLICATIONS

This application is related to U.S. patent application Ser. No. 12/658,461, filed Feb. 11, 2010, which application is incorporated here by reference.

FIELD OF THE INVENTION

The invention described and claimed in this application relates to cabinets for storing, routing and interconnecting optical fiber cables and data copper cables, and related optical system devices and modules.

BACKGROUND OF THE INVENTION

It is common practice at central switching offices and other interconnection facilities to contain fiber optic and wire cables in protective troughs suspended horizontally above routers or other equipment where the cables terminate. Cables associated with a given piece of equipment are allowed to drop a certain distance in an exposed state from the trough above the equipment, and to enter cable ports of the equipment. Thus, if a new cable must be connected to equipment in addition to existing connected cables, it is not uncommon to lash the new cable to the existing cables where exposed so as to provide the new cable with ample support. It will be appreciated, however, that such lashing can disturb the orientation of the existing cables and increase signal attenuation within the cables, especially if the cables are disturbed near their associated equipment ports.

It is known generally to attach a so-called vertical cable management trough to either side of a router to contain cables that run next to the router. See, Cisco Systems, Inc., Model XR 12416 and XR 12816 Router Chassis Installation Guide (March 2009), at pages 3-23 and 3-24. So-called inter-bay fiber management assemblies are also known that are constructed to contain and manage the routing of fiber optic cable at different levels or bays of an equipment rack, or the bays of two adjacent equipment racks. See U.S. Pat. No. 6,541,705 (Apr. 1, 2003), U.S. Pat. No. 6,571,047 (May 27, 2003), U.S. Pat. No. 6,845,206 (Jan. 18, 2005), and U.S. Pat. No. 7,437,048 (Oct. 14, 2008). See also, ADC Telecommunications, Inc., Unequal Flange Rack Installation Instructions (February 2001), at pages 31-34.

While the equipment just described functions adequately, improvements in optical system cable handling are continually sought. For example, the patent application referenced above describes a cabinet with a plurality of cable retainer boxes (CRBs) mounted adjacent to either side of a given piece of equipment, enabling protection of cables contained inside the cable management cabinet and facilitating effective organization of cables. The CRBs are spaced vertically along either one or both sides of equipment. The CRBs each have an open end that faces into the cabinet for ingress/egress of cables from optical devices contained with the cabinet.

This cable management equipment has proven effective for use in central office switching facilities. However, recent improvements have advanced cable management practices even further.

STATEMENT OF THE INVENTION

Many optical system installations incorporate and interconnect both data copper cables and optical fiber cables. In most aspects of these, including installation, repair and replacement, the data copper cables are separate and distinct from the optical fiber cables. The cable management cabinet described above is improved by separately managing the routing of data copper cables and optical fiber cables within the cabinet. This is accomplished by providing separate CRBs for data copper cables and optical fiber cables respectively. The CRBs are provided with front openings to facilitate installation and routing of optical fiber cable and data copper cables. The openings may be provided with edge guards to ease ingress/egress of cables through the openings.

BRIEF DESCRIPTION OF THE DRAWING

The invention will be more easily understood with the aid of the drawing, in which.

DETAILED DESCRIPTION

Figure 3:
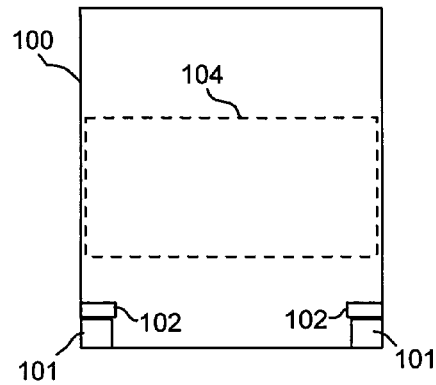
FIG. 3 is a top view of FIG. 1.
Figure 1:
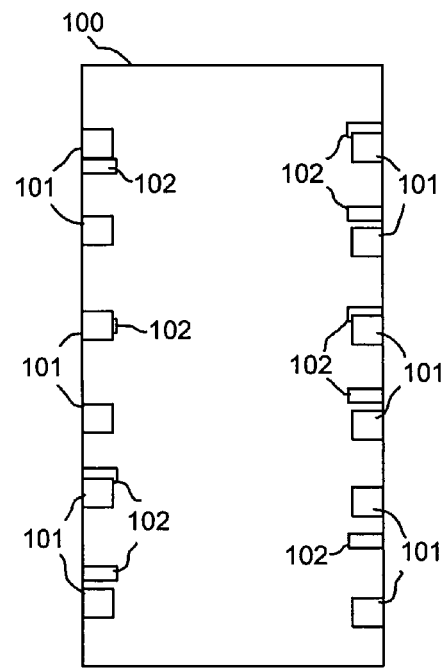
FIG. 1 is a front view of a cable management cabinet showing the cable retainer boxes attached to the inside of the cabinet.
Figure 2:
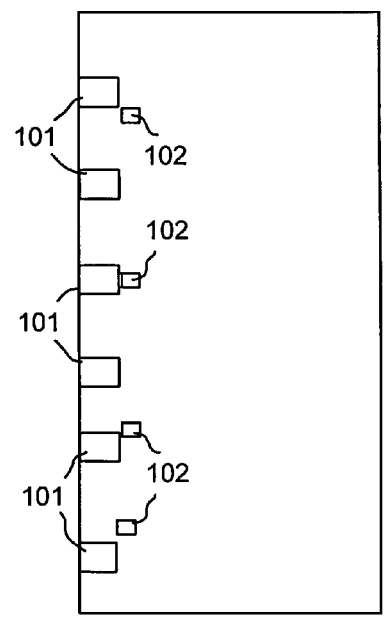
FIG. 2 is a side view of FIG. 1 taken from inside the cable management cabinet.

FIGS. 1-3 are schematic representations of a cable management cabinet according to the invention. FIG. 1 shows the cabinet in plan view, FIG. 2 shows the left side of the interior of the cabinet and FIG. 3 is a top view. Within the cabinet are CRBs 101 and 102. The optical fiber CRBs 101 are intended for optical fiber cables and the data copper cable CRBs 102 are designed for data copper cables. The CRBs are mounted to the cabinet housing as shown in more detail below. The number and placement of the CRBs along the sides of the cabinet is such that the cables may be routed efficiently to allow interconnection to optical system components housed within the cabinet. A typical installation will have at least a plurality of each type of CRB. A plurality in the context of the invention is at least three. A typical component is represented 104 in FIG. 3. The front of the cabinet is typically open to allow easy access to the interior. Shelves (not shown) may be provided in the cabinet to support optical system components. The figures show CRBs mounted on both sides of the cable management cabinet. However, cabinets may be designed for optical systems with smaller numbers of cables, in which case CRBs mounted along one side only may be sufficient to accommodate all the cables in the cabinet.

Figure 4:
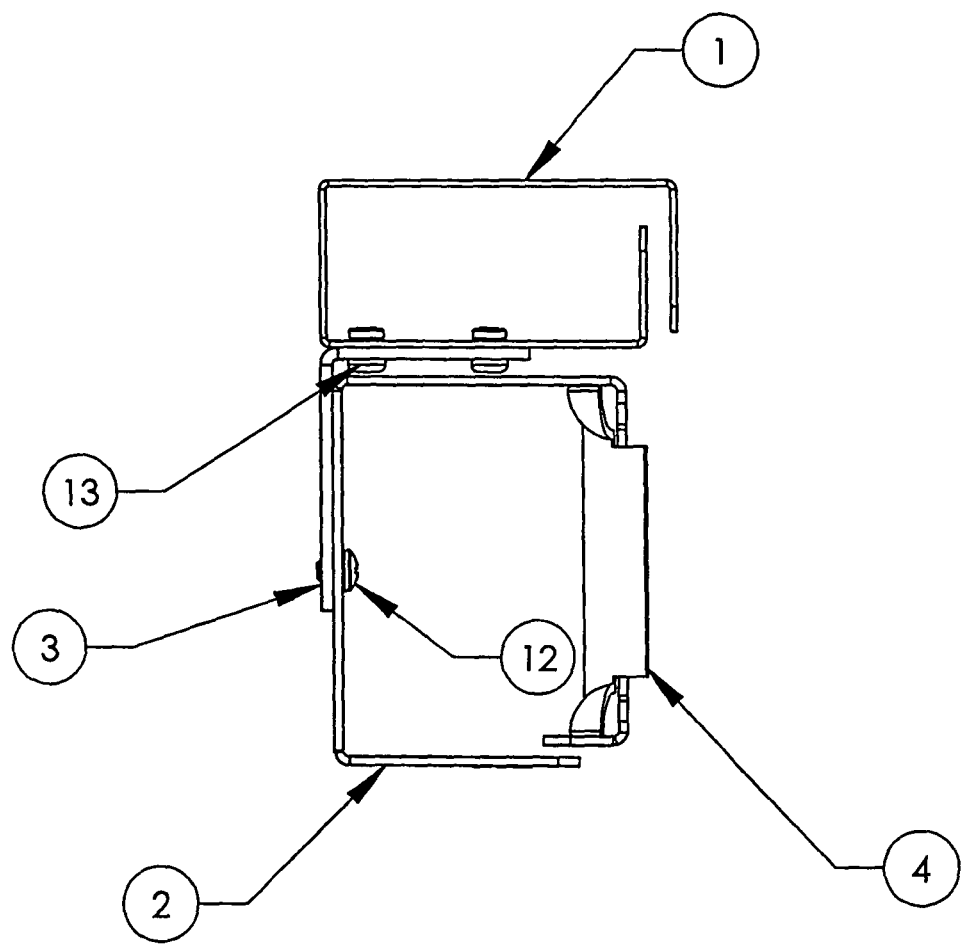
FIG. 4 is a detailed view of an optical fiber CRB and a data copper cable CRB.
Figure 5:
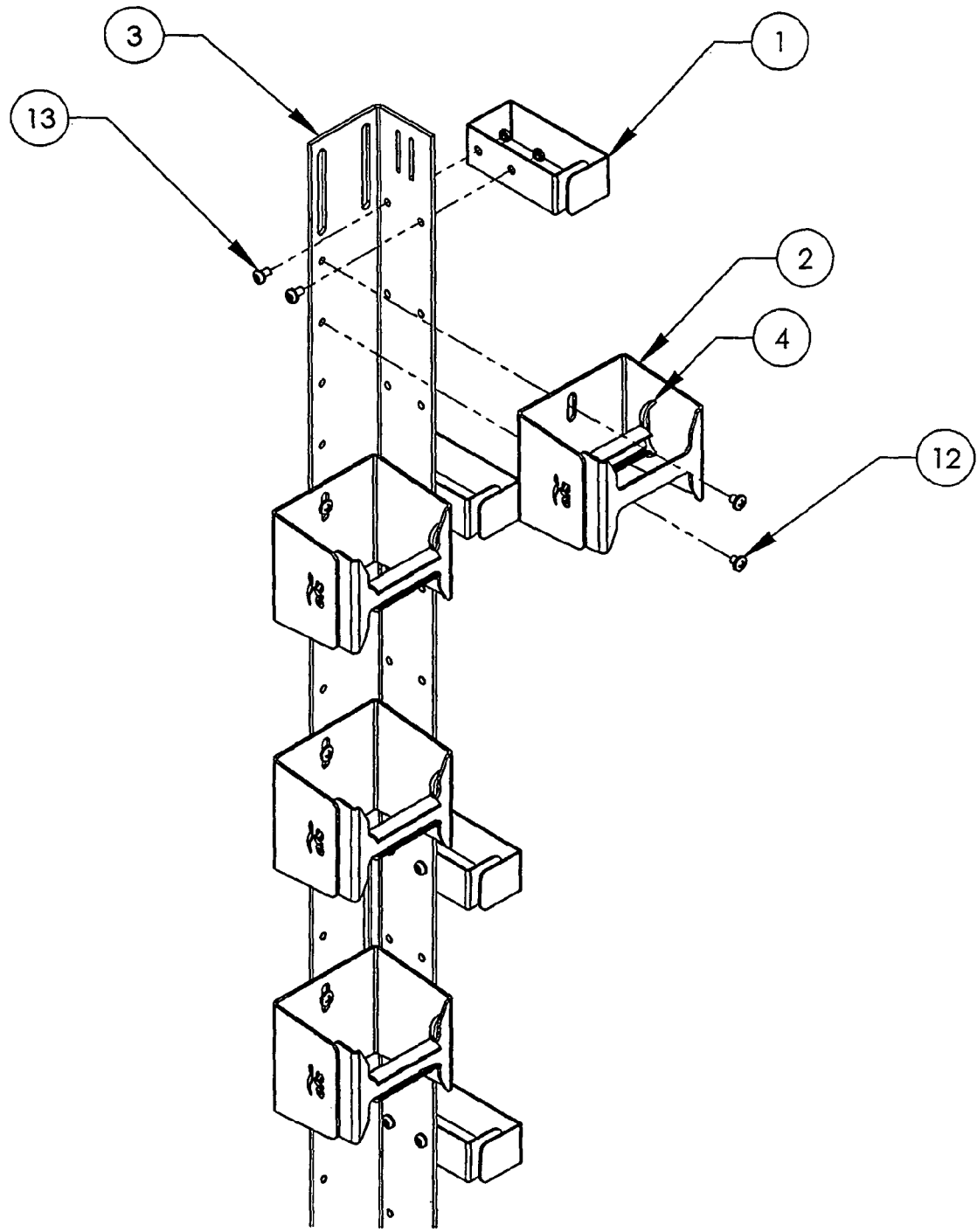
FIG. 5 is a detailed view showing both optical fiber cable CRBs and data copper cable CRBs mounted within a cable management cabinet.

The CRBs are shown in more detail in FIGS. 4 and 5, where an L-shaped mounting bracket 3 supports both types of CRBs. FIG. 4 shows an optical fiber CRB and a data copper cables CRB attached to mounting bracket 3. FIG. 5 shows a perspective view of four optical fiber CRBs and four data copper cables CRBs attached to the mounting bracket, similar to the arrangement shown schematically in FIGS. 1-3. The mounting bracket 3 is attached to an interior side the cabinet, and extends continuously along the length (height) of the cabinet. As suggested above, the bracket and the CRBs may extend along one side or both sides of the cabinet.

In FIGS. 4 and 5 the data copper cable CRB is shown at 1, and the optical fiber cable CRB is shown at 2. In this particular embodiment the outside of the long arm of the L-shaped mounting bracket is attached to the cabinet 100. The optical fiber cable CRB is attached to the inside of the long arm of the L-shaped mounting bracket, as shown, with fasteners 12. The data copper cable CRB is attached to the short arm of the L-shaped mounting bracket with fasteners 13. Both of the CRBs are provided with slots on one side of the CRB to accommodate installation and/or removal of the respective cables. Typically, data copper cables are larger than the optical fiber cables so the slots in the data copper cables CRBs may be larger than the slots in the optical fiber cable CRBs.

In the arrangement shown the mounting bracket is L-shaped and the CRBs are mounted to the arms of the mounting bracket. However, a variety of options may be used to achieve the same or similar benefits. For example, the positions of the data copper cable CRB and the optical fiber cable CRB may be switched. The mounting bracket may be T-shaped. As should be evident, a T shape incorporates an L shape. The CRBs may be attached directly to the cabinet.

According to another alternative embodiment, data copper cable CRBs may be mounted on one side of the cabinet and optical fiber cable CRBs may be mounted on the other side of the cabinet.

In FIGS. 4 and 5 the slots in the data copper cable CRBs are located in the side of the CRB facing toward the interior of the cabinet. Recognizing that the data copper cable CRBs and the optical fiber cable CRBs are not required to be positioned together at the same height in the cabinet, and in the case where the data copper cable CRBs are attached directly to the cabinet, the side of the data copper cable CRB that faces the back of the cabinet, or the side of the data copper cable CRB that faces the front of the cabinet, are accessible positions for placement of the slots. Either position may be used. Arrangements where slots are available on more than one side can be envisioned, but the construction of the CRB is simplified if only one side is provided with a slot, and the slot is formed by overlapping portions of the sidewall of the CRB.

Options similar to those just described are also available for placement of the slots in the optical fiber cable CRB.

As shown in FIGS. 4 and 5, the front of the optical fiber cable CRBs is provided with a bar that extends across the front of the box structure. This construction is preferred since it allows optical fiber cable CRBs to be placed closer together in the vertical dimension than if the front of the CRB had the approximate dimensions of the sides of the CRB. It also provides a U-shaped channel for confining multiple optical fiber cables as they ingress/egress from the CRB. The structure of the front of the CRB in FIGS. 4 and 5 is actually H-shaped. However, that shape is optional. The main desirable feature may be defined as a bar extending laterally across the front face of the CRB to form a U-shaped channel for ingress/egress of optical fiber cables from the CRB.

For the purpose of describing the invention the distinction between data copper cables and optical fiber cables may be significant. Optical fiber cables carry light guiding optical glass fibers. Data copper cables typically comprise insulated copper wires.

Intuitively it would be expected that the optical fiber cables, when bent around the edges of an optical fiber cable CRB, will experience a high degree of friction, and may resist pulling into the position desired for routing and interconnection. They may even chafe to the point of failure. According to a feature of the invention, the bar that extends across the front of the optical fiber cable CRB, and forms the U-shaped channel just described, is provided with two edge guard attachments for reducing the friction of the optical fiber cables as they ingress/egress from the optical fiber cable CRB. The first is a bend radius insert for maintaining a minimum bend radius of the optical fiber cables as it travels across the bar. The bend radius insert it attached to the bottom of the U-shaped channel. The second is a sidewall fillet insert for achieving the same objective along the sides of the U-shaped channel. It is convenient to form these as a unitary body, as shown as 4 in FIGS. 4 and 5. However, they may be provided as two or more elements. The bend radius insert is an element intended to be defined by those terms. Specifically, it may be defined as a curved edge cover having a curve with a radius at least equivalent to the radius of the optical fiber cables. When the term bend radius insert is used herein, as an element applied to the bottom edge of the U-shaped channel described above, it is meant to have this definition. This definition which, when considered with the totality of the description and figures herein, has clear and concise meaning.

Likewise, the sidewall fillet insert is an element intended to be defined by those terms. Specifically, it may be defined as a curved edge cover having a curve with a radius at least equivalent to the radius of the optical fiber cables. When the term sidewall fillet insert is used herein, as applied to either or both sides of the U-shaped channel described above, it is meant to have this definition. Similarly with the definition of the bend radius insert, a sidewall fillet insert, is a term that when considered with the totality of the description and figures herein, has clear and concise meaning.

In the embodiments described above the CRBs that accommodate data copper cables are smaller than the CRBs that route optical fiber cables. While that will usually be the case, the opposite construction may be used, or the CRBs may be the same size and shape. In most cases the CRBs are provided with openings in the top and bottom, an opening in the front sidewall, and a slot in one of the three remaining sidewalls. The CRBs may be referred to as having a height, a width and a depth, with the top and the bottom defining the height.

The cable management cabinet may be referred to as a rectangular structure having a top, a bottom, a back, a front, and two sides, and having a height, width and depth, with the long dimension of the rectangular structure corresponding to the height. The cabinet typically has openings in the top and the front. It may have a cover for the front opening. The width and the depth of the cabinet may be the same or different.

Likewise the CRBs may be described as having a top, a bottom, a front, a back, and two sides. The back of the CRBs are attached to one or both sides of the cabinet with the height of the CRBs aligned to the height of the cabinet. In that configuration the front of the CRB faces the interior of the cabinet.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the following claims.

The invention claimed is:

1. A cable management installation comprising:
   a) a rectangular cabinet having a top, a bottom, a back, a front, and two sides, and having a height, width and depth, with the long dimension of the rectangle corresponding to the height,
   b) an elongated mounting bracket attached to one side of the cabinet, extending along the height of the cabinet,
   c) a plurality of cable retainer boxes (CRBs) attached to the mounting bracket, the CRBs having a top, a bottom, a back, a front, and two sides, and having a height, width and depth, and attached to the mounting bracket with the height aligned to the height of the cabinet, each of the CRBs additionally having:

i) an opening in the front of the CRB,
ii) a bend radius insert, and
iii) a first sidewall fillet insert
wherein the opening is a U-shaped channel with a channel base and a first channel side, the bend radius insert attached to the base of the U-shaped channel and the first sidewall fillet insert is attached to the first channel side of the U-shaped channel.

2. The cable management installation of claim 1 further including a second sidewall fillet insert attached to a second channel side of the U-shaped channel.

3. The cable management installation of claim 2 wherein the bend radius fillet and the first and second sidewall fillets comprise a unitary body.

4. A cable management installation comprising:
   a) a rectangular cabinet having a top, a bottom, a back, a front, a first side and a second side, and having a height, width and depth, with the long dimension of the rectangle corresponding to the height,
   b) an elongated mounting bracket attached to the first side of the cabinet, extending along the height of the cabinet,
   c) a first plurality of optical fiber cable retainer boxes (CRBs), adapted to route optical fiber cables, attached to the mounting bracket, the optical fiber CRBs having a top, a bottom, a back, a front, and two sides, and having a height, width and depth, and attached to the mounting bracket with the height aligned to the height of the cabinet, each of the optical fiber CRBs having a slot in one of the said two sides for inserting optical fiber cables into the optical fiber CRB,
   d) a first plurality of data copper cable CRBs, adapted to route data copper cables, attached to the mounting bracket, the data copper cable CRBs having a top, a bottom, a back, a front, and two sides, and having a height, width and depth, and attached to the mounting bracket with the height aligned to the height of the cabinet, each of the data copper cable CRBs having a slot in one of the said two sides for inserting data copper cables into the data copper cable CRB,
wherein the optical fiber CRBs and the data copper cable CRBs are of different sizes wherein at least one of the plurality of optical fiber CRBs are provided with: i) an opening in the front of the optical fiber CRB, ii) a bend radius insert, and iii) a first sidewall fillet insert, wherein the opening is a U-shaped channel with a channel base, and a first channel side, the bend radius insert attached to the channel base and the first sidewall fillet insert attached to the first channel side.

5. The cable management installation of claim 4 wherein the optical fiber CRBs are larger than the data copper cable CRBs.

6. The cable management installation of claim 4 including data copper cables installed in the plurality of data copper cable CRBs and optical fiber cables installed in the plurality of optical fiber cable CRBs.

7. The cable management installation of claim 4 wherein the opening further comprises a second channel side.

8. The cable management installation of claim 7 further including a second sidewall fillet insert attached to the second channel side.

9. The cable management installation of claim 8 wherein the bend radius fillet and the first and second sidewall fillets comprise a unitary body.

10. The cable management installation of claim 4 further including:
    e) a second elongated mounting bracket attached to the second side of the cabinet, extending along the height of the cabinet,
    f) a second plurality of optical fiber cable retainer boxes (CRBs), adapted to route optical fiber cables, attached to the second mounting bracket, the optical fiber CRBs having a top, a bottom, a back, a front, and two sides, and having a height, width and depth, and attached to the mounting bracket with the height aligned to the height of the cabinet, each of the optical fiber CRBs having a slot in one of the sides for inserting optical fiber cables into the optical fiber CRB,
    g) a second plurality of data copper cable CRBs, adapted to route data copper cables, attached to the second mounting bracket, the data copper cable CRBs having a top, a bottom, a back, a front, and two sides, and having a height, width and depth, and attached to the mounting bracket with the height aligned to the height of the cabinet, each of the data copper cable CRBs having a slot in one of the sides for inserting data copper cables into the data copper cable CRB.

11. The cable management installation of claim 10 including data copper cables installed in the first and second plurality of data copper cable CRBs and optical fiber cables installed in the first and second plurality optical fiber cable CRBs.

12. The cable management installation of claim 4 wherein the mounting bracket comprises an L-shape, with a long side and a short side, and the long side having an inside and an outside, with the outside of the long side of the mounting bracket attached to the cabinet, the first plurality of optical fiber cable retainer boxes (CRBs) attached to the inside of the long side of the mounting bracket, and the first plurality of data copper cable CRBs attached to the short side of the mounting bracket.

13. The cable management installation of claim 12 where the plurality of optical fiber cable retainer boxes (CRBs) and the plurality of data copper cable CRBs are switched.

14. The cable management installation of claim 12 including data copper cables installed in the plurality of data copper cable CRBs and optical fiber cables installed in the plurality of optical fiber cable CRBs.

15. The cable management installation of claim 13 including data copper cables installed in the plurality of data copper cable CRBs and optical fiber cables installed in the plurality of optical fiber cable CRBs.

* * * * *